United States Patent [19]
Hofrichter

[11] Patent Number: 4,881,704
[45] Date of Patent: Nov. 21, 1989

[54] LANDING FLAP SYSTEM

[75] Inventor: Gerhard Hofrichter, Bremen, Fed. Rep. of Germany

[73] Assignee: Messerschmitt-Boelkow-Blohm GmbH, Bremen, Fed. Rep. of Germany

[21] Appl. No.: 184,197

[22] Filed: Apr. 21, 1988

[30] Foreign Application Priority Data

Apr. 22, 1987 [DE] Fed. Rep. of Germany ....... 3713465

[51] Int. Cl.$^4$ ............................................... B64C 3/38
[52] U.S. Cl. ................................................... 244/213
[58] Field of Search ........................ 244/213, 214, 215

[56] References Cited

U.S. PATENT DOCUMENTS 2,938,680  5/1960  Greene et al. ...................... 244/214

FOREIGN PATENT DOCUMENTS 2100733  7/1971  Fed. Rep. of Germany .
193935   5/1967  U.S.S.R. ............................. 244/213
1496518  12/1977 United Kingdom ................ 244/213

Primary Examiner—Joseph F. Peters, Jr.
Assistant Examiner—Rodney Corl
Attorney, Agent, or Firm—Ralf H. Siegemund

[57] ABSTRACT

A landing flap system in an aircraft wing, includes an upper and a lower track and a drive for a tandem, flap moving carriage, being composed of an inner carriage having a plurality of rollers for running on the upper track and an outer carriage having at least two rollers for running on the lower track; a hinge pin interconnects the carriages and connects them to the landing flap; a second hinge connects the outer carriage to the landing flap; a thrust and tension rod hingedly connects the outer carriage to the drive; and further rollers are arranged at an acute angle to an axis that extends vertically to such axes and to an axis that is parallel to the longer internal axis of the craft, the further rollers balancing the carriages.

5 Claims, 6 Drawing Sheets

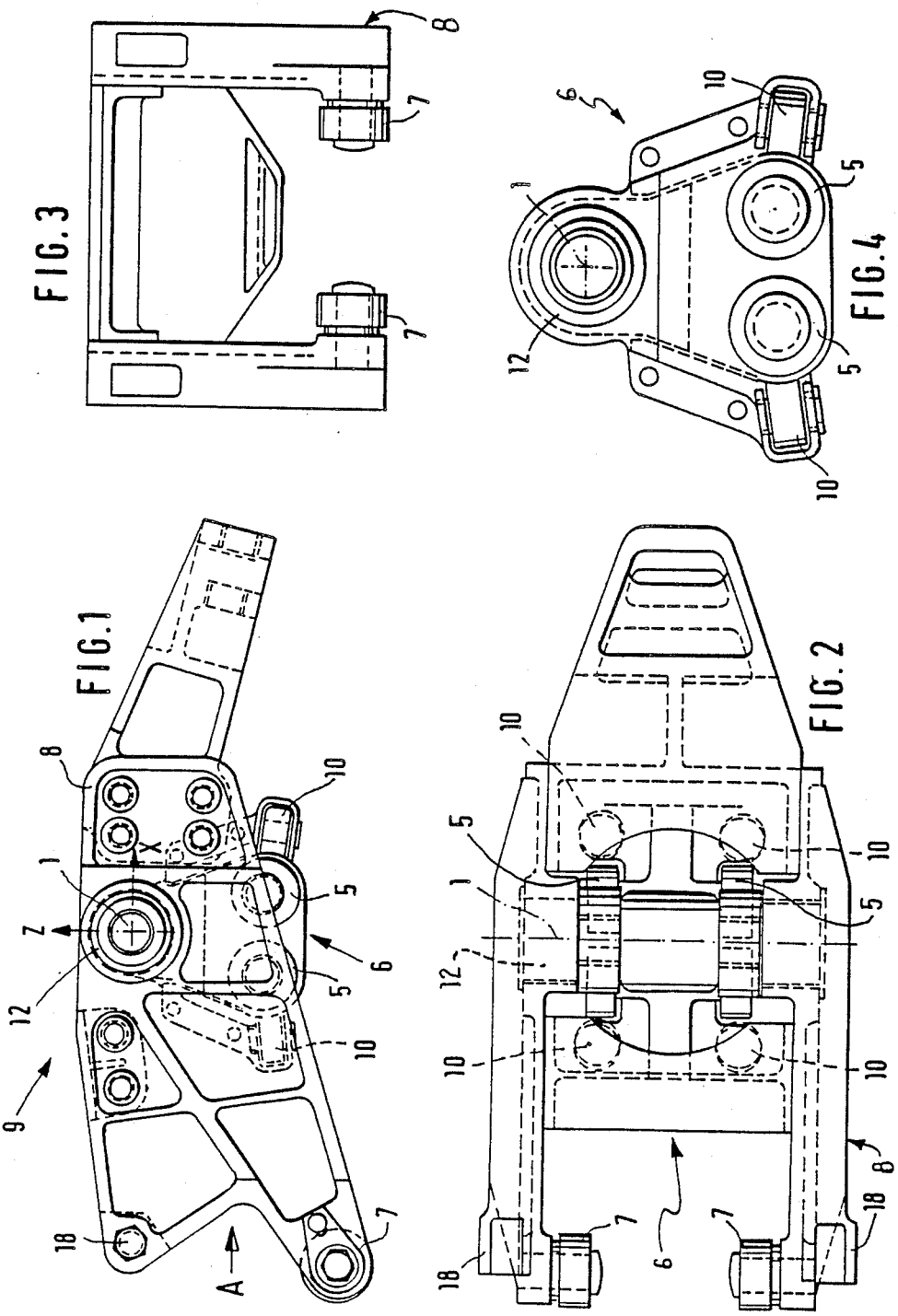

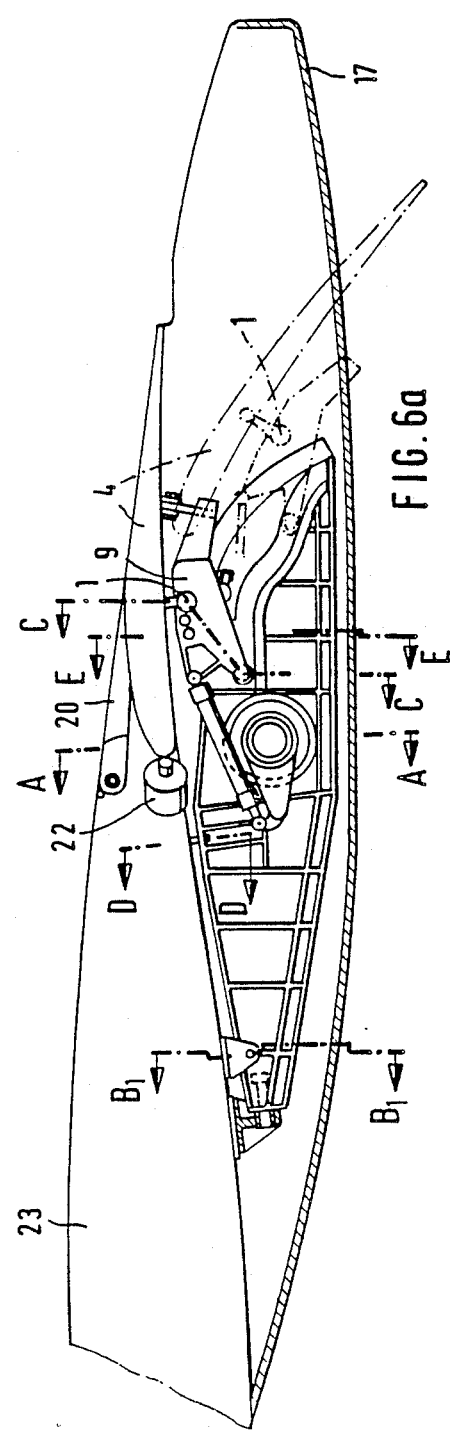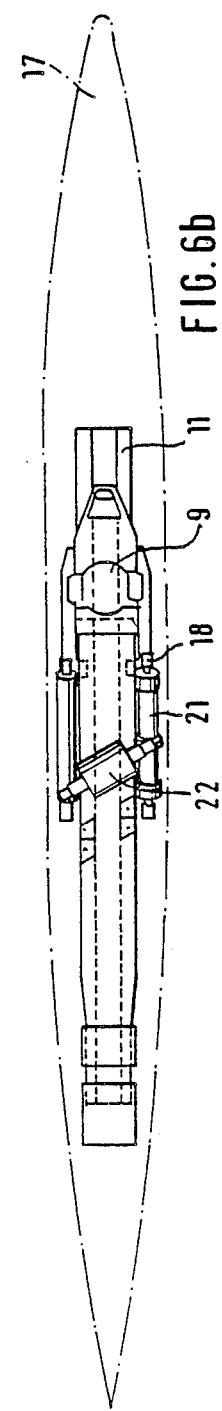

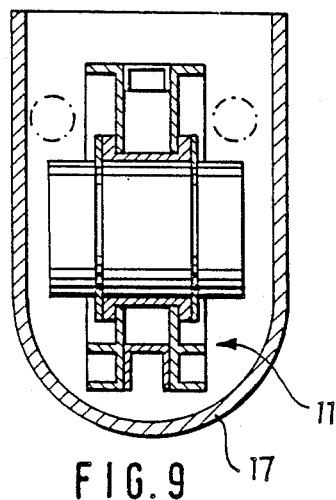
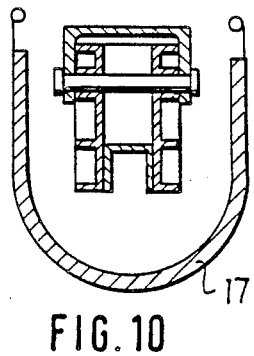
FIG. 9   FIG. 10
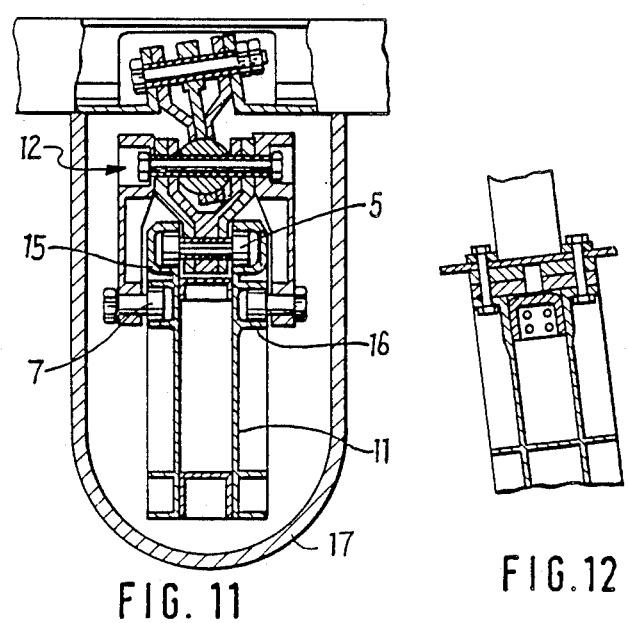
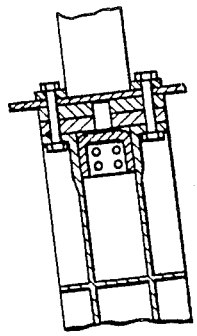
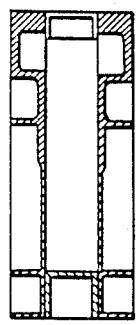
FIG. 11   FIG. 12   FIG. 13

LANDING FLAP SYSTEM

BACKGROUND OF THE INVENTION

The present invention relates to a landing flap carriage pertaining to a landing flap system of an aircraft wing, the system further including guide rails for the carriage and being arrranged under or in the wing, the rails or rail system includes further an upper and lower roller track, the flap system includes one or several flap adjustment drives, flaps proper, and spoilers covering, at least in parts, the flaps; there being supplementary cover elements and structure to maintain aerodynamic integrety of the wing.

Devices of the type to which the invention pertains, are, for example, shown in German printed patent application P 35 30 865.6 and P 36 41 247.3, respectively, corresponding to U.S. applications Ser. Nos. 900,508 (MBB/K370) and 127,943 (MBB/L006). Here, the flaps are carried and guided by means of flap carriages being of a single piece construction and highly resistant against twisting. The carriages include a few relatively large rollers. There is an inherent wear effective between the roller track, on one hand, and the rollers of the carriage, on the other hand. This wear depends on a mechanical phenomenon, called the "Herz Face, Surface or Contact Pressure", which is a direct function of the diameter of the rollers. The larger a roller is in diameter, the larger is the life of the rollers, as well as of the tracks.

Wing sections used at the present time, as well as anticipated to be used in the future, are expected to experience rather high loads along the trailing edge. This means that the known flaps with carriage and, of course, the rails themselves, have to be heavier on account of the large and heavy wheels, and all that entails large bodies for coverage for maintaining a streamlined exterior. Consequently, this whole structure is very heavy which adds to the load, other than useful load, as far as the aircraft is concerned.

DESCRIPTION OF THE INVENTION

It is an object of the present invention to provide a new and improved landing flap carriage system basically following the principles outlined above, but permitting lighter and more compact construction, particularly as compared with the known construction.

It is another object of the present invention to provide a new and improved landing flap carriage structure, including rail and control systems wherein the so-called "Herz Pressure" is reduced to thereby increase the life of the rollers.

It is a desirable feature of the invention to provide a landing flap carriage structure with rail systems such that all the forces reacted into the landing flap from the outside are safely reacted into the rails without requiring a higher frequency in maintenance, as far as these elements are concerned.

In accordance with the preferred embodiment of the present invention, it is suggested to provide a structure wherein the connecting point between a forward part of a landing flap and the landing flap operating carriage, is selected such that on retraction of the flap this connection point is situated shortly in front of the resultant point of attack of the resulting air forces as they act on the landing flap. Owing to this particular kinematics, the dynamics is improved in that practically all loads on the flap are reacted into the landing flap carriage via that connect point. On the other hand, the inventive construction, particularly in the case of a two-part landing flap carriage, permits an immediate and direct reaction of these forces into landing flap carriage guide rail, as was desired in accordance with the objective purpose of the invention.

The flap moving carriage includes an inner carriage having a plurality of rollers for running on the upper track; an outer carriage having at least two rollers for running on the lower track, a hinge pin for interconnecting the inner and the outer carriage and hinging them about an axis that extends parallel to axes of those rollers; the hinge pin, moreover, connects the carriages to the landing flap; second, hinged connection is provided for connecting the outer carriage to the landing flap; a thrust rod and tension structure hingedly connects the outer carriage to a drive; and further rollers are arranged at an acute angle to an axis that extends vertically to such axes and to an axis that is parallel to the longer internal axis of the craft, the further rollers stabilize and position balance the carraiges.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

FIG. 1 illustrates a side view of a novel tandem landing flap carriage to be used in the landing flap system that is improved in accordance with the present invention for practicing the best mode thereof;

FIG. 2 illustrates a top elevation as seen along the Z-axes towards the flap carriage shown in FIG. 1;

FIG. 3 is a frontal view, as indicated by arrow in FIG. 1;

FIG. 4 illustrates the inter part of the carriage system shown in FIG. 1;

FIG. 6a is a view similar to FIG. 5, and FIG. 6b shows the related top elevation; FIG. 6a, moreover indicates, the section planes A, B, C, D, and E, respectively, representing the planes of sections views of FIGS. 9, 10, 11, 12, and 13.

Figure 5:
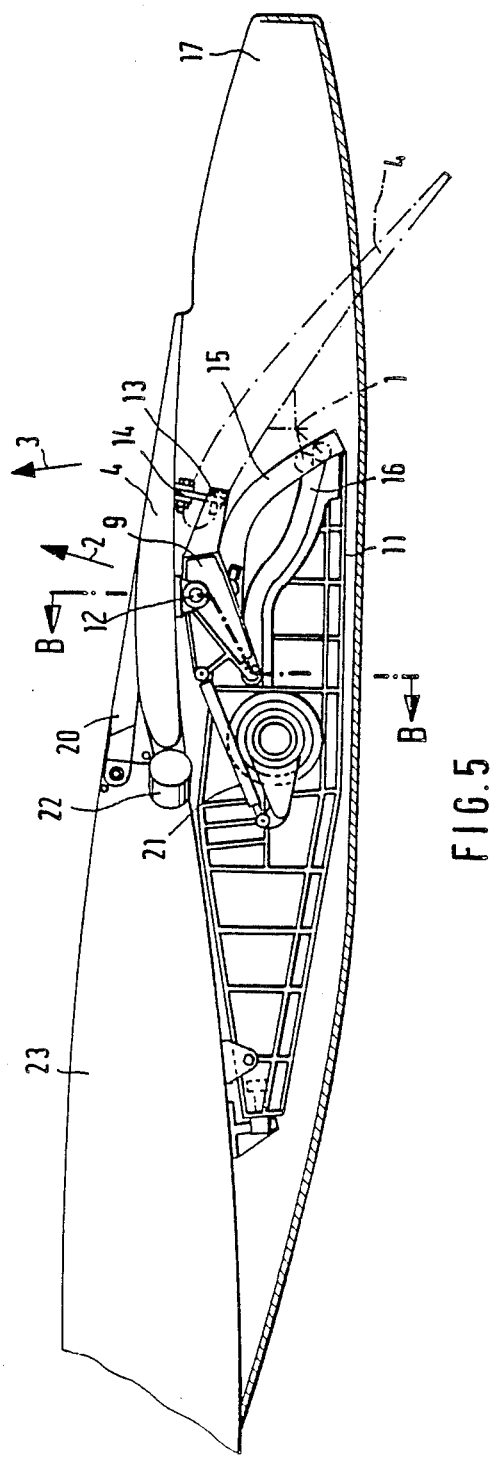
FIG. 5 is a cross-section through a trailing edge portion of an aircraft wing showing an example for mounting a carriage shown in FIGS. 1–4 into that wing.

The outer carriage 8 journals two rollers 7 having axes of rotation which extend in the Y-direction of a coordinate system, Z being the normal or vertical direction. The origin of that coordinate system is situated in the hinge point 1. The positive X-axis of this coordinate system points in downstream direction, as shown in FIG. 1. The inner carriage 6, being connected to the outer carriage 8 through hinge point 1, is, moreover, provided with four rollers 5. The axes of the rollers 5 likewise point in the Y-direction. In addition, there are four rollers 10 with axes having an acute angle to the Z-axis.

Two outer thrust and tension rods 21 are connected to a hinge point 18 of the carriage 8, and are provided for driving the tandem landing flap carriage 9 and, therefore, the flap 4. The rods 21, in turn, are actuated upon by a drive 22. In case of a push or pull motion, the flap carriage 9 is caused to run on a carriage guide rail 11 having an upper track 15 and a lower track 16. Here then the four rollers 5 and the four rollers 10 of the inner carriage 6 run in an upper track 15. As can be seen from FIGS. 7, 8, and others, upper tracks 15 have horizontal, as well as near vertical running surfaces to accommodate all these rollers. The rollers 7 of the outer carriage run on a lower track 16. The support for the rollers and the carriage is provided accordingly.

The carriage 9 and the frontal part of the landing flap 4 are interconnected in accordance with the invention such that in the inserted or retracted state of the flap 4, the resulting air force 2 acts just a little behind the hinge point 1. Owing to this arrangement almost all forces acting on the landing flap are transmitted and reacted through this hinge point 1, and particularly the pin 12, upon the four rollers 5 of the inner carriage 6. As the landing flap is protracted, the air force vector 3 (FIG. 5) moves in relation to the hinge point 1 in forward direction. When the landing flap is fully extended, the vector 3 now is situated in front of the hinge point 1.

Certain side forces act on the landing flap 4 and result, on one hand, from the aerodynamic forces and by the mass inertia, on the other hand. These side or lateral forces also reacted into the inner carriage 6 through the hinge point 1 and pin 12. On account of the four rollers 10, these forces are directly transmitted and reacted into the rail system 11.

It can readily be seen that the outer carriage 8 has just the task of preventing a rotation or tilting of the flap 4 about the hinge point 1. This preventive function obtains, because the rollers 7 of the outer carriage 8, bear on the lower rail track 16 of the rail system 11. Since the outer carriage 8 itself will be required to take up only a few lateral forces owing to the oblique pulling action of the frame 13, it is not necessary to provide this carriage with a conventional high stiffness.

Figure 7:
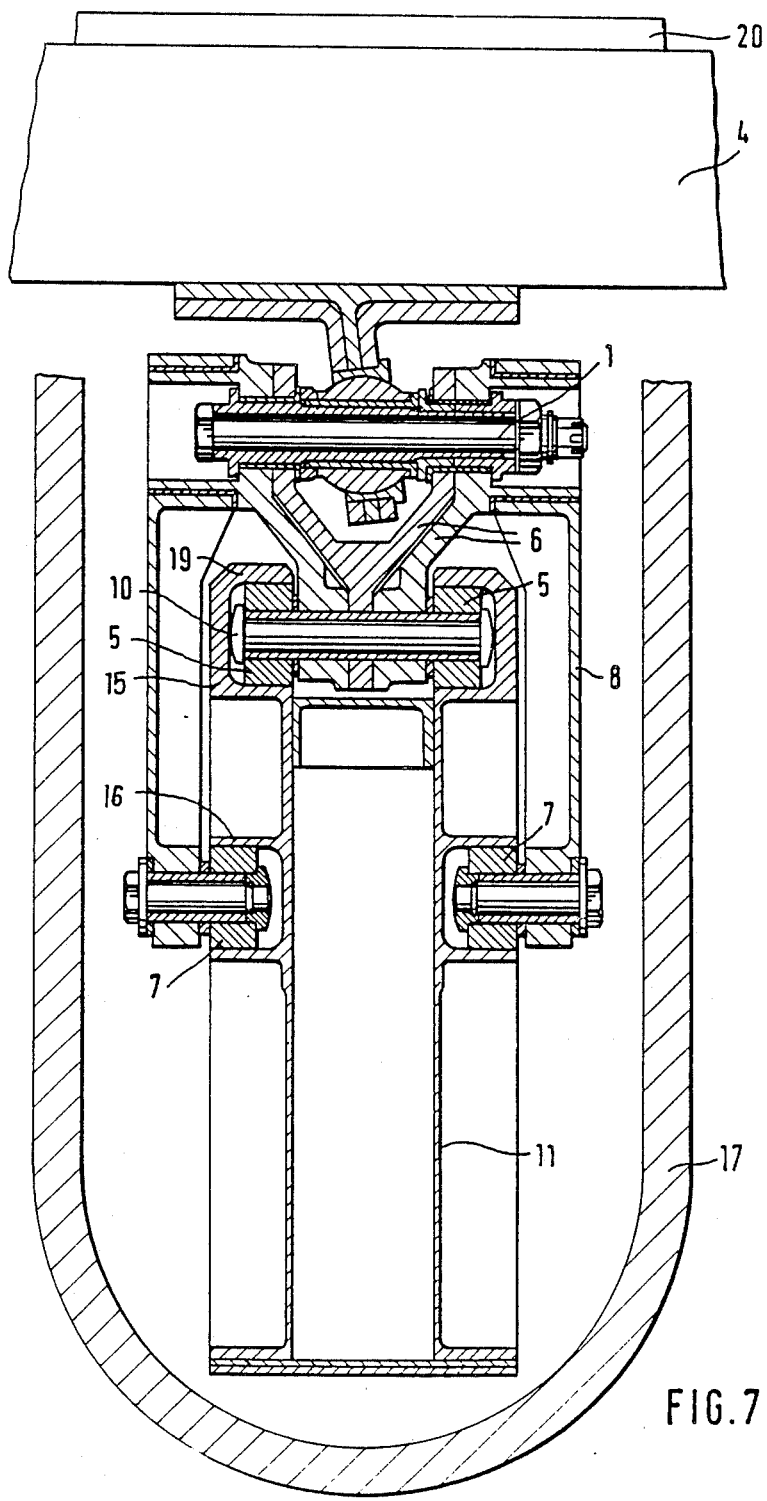
FIGS. 7 and 8 illustrate sections as indicated by B—B in FIG. 5, the two figures differ by certain modifications in detail. Proceeding now to the detailed description of the drawings, an inventive tandem landing flap carriage 9 is provided in a wing 23 having a trailing edge flap 4. Carriage 9 is comprised of an inner carriage 6 and an outer carriage 8. These two carriages 6 and 8 are interconnected in a hinge point 1 under utilization of a hinge pin 12. Moreover, the carriage as a whole is connected to the landing flap 4, particularly the front part of the carriage is connected to flap 4 right at that point, using the same hinge pin 12 for the connection. The trailing portion of the flap 4 is, moreover, connected separately to the outer carriage 8 through a second hinge point 14 under utilization of a steering frame and mechanism 13. This is shown in greater detail in FIG. 5.
Figure 8:
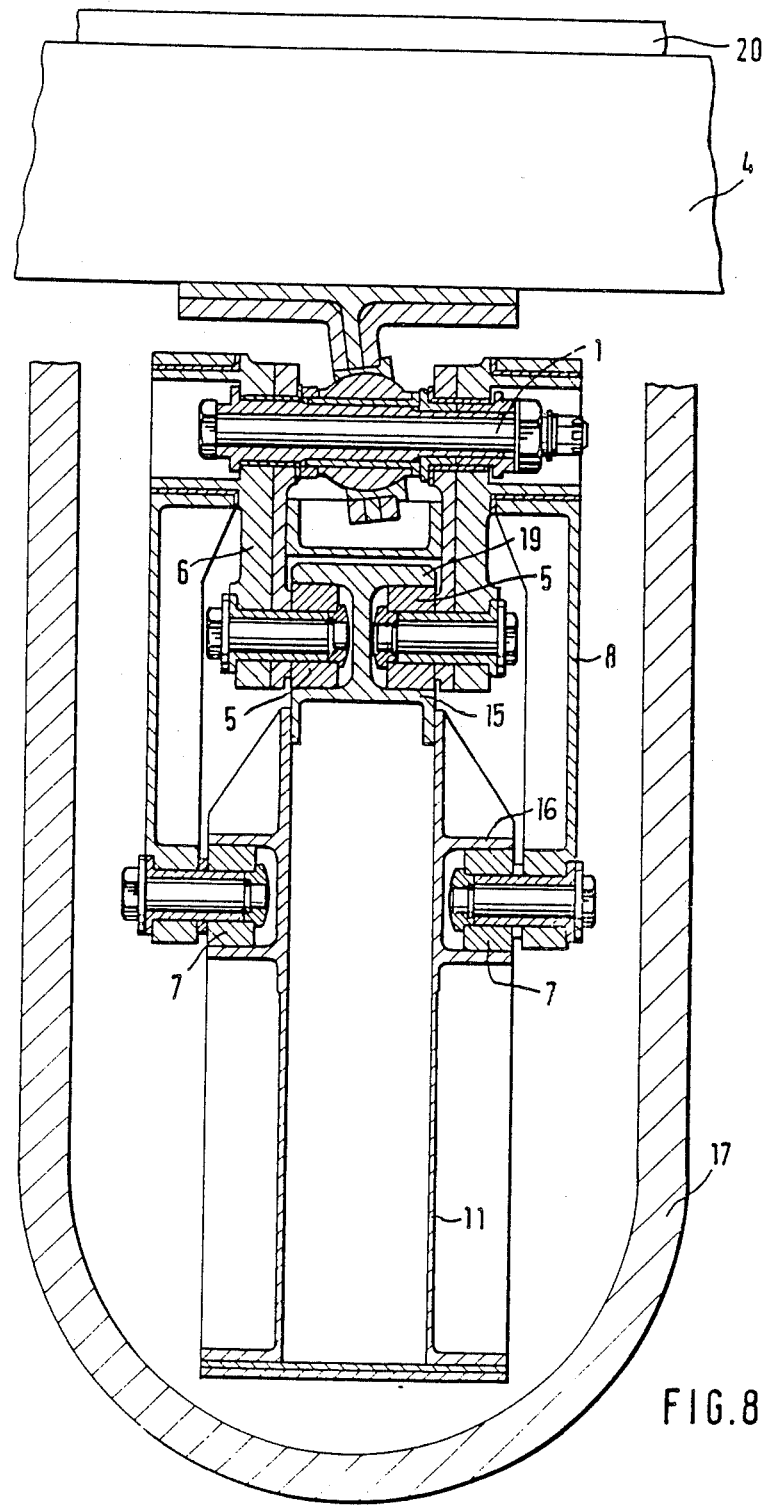

Examples of the connection between flap 4 and carriage, at pin 12, are shown in detail and in two versions for the section B—B in FIG. 5, in FIGS. 7 and 8. Turning first to FIG. 7, there is also shown in greater detail an example for the construction of the inner carriage 6. The outer carriage 8 runs by means of its two rollers 7 on the lower track 16 of the rail system 11. On the other hand, the upper track 15 accommodates the eight rollers 5 and 10 of the inner carriage 6. The flap 4 is in cases covered by the spoiler 20. As stated, flap 4 is connected in hinge point 1 to inner carriage 6 and outer carriage 8 in pivotable or hinge-like fashion. Preferably, the inner carriage 6 has a Y-shaped cross-section in the area of the hinge point 1. By comparing known structures, one can readily see that the structure presently proposes equalizing the load through the rollers 5 and 7 of the flap carriage 9 for lower bending of the leg 19 of the upper portion of the track. The device shown in FIG. 7, moreover, is the most compact arrangement deemed possible.

FIG. 8 shows a variation which is not deemed, however, to be as favorable. As shown in FIG. 8, the inner carriage 6 is a U-shaped cross-section rather than a V-shaped one, and that simply is not as favorable as far as the kinematics and static is concerned.

Proceeding now to the description of FIGS. 6a and 6b in conjunction with FIGS. 9 through 13, one can see here that the rear portion of the wing 23, depicted in various cross-sections. The tandem landing flap carriage 9 is moved by means of the drive 22 under utilization of the two thrust/tension rods 21. Reference numeral 11, again, refers to the rail system for the landing flap carriage. The lower, projecting position of the landing flap 4 is indicated in dotted lines, so is the position of carriage 9 in that instance. Here then a streamlining cover 17 is likewise pivoted in down direction which is not illustrated. The section of FIG. 11 runs through the hinge point 1, and that part is identical to the section B—B as shown in FIG. 5.

The invention offers the advantages which flow from improvements over known landing flap carriages. First of all, the transmission and reaction path for forces is reduced, while, on the other hand, reacting the forces from the landing flap as they act on the flap, into the structure, is distributed to a larger number of rollers. This, in turn, permits a lighter and more compact design for the carriage as a whole, as well as for the rail system 11. For the same diameter of the rollers that are used one has increased their use life considerably.

The invention is not limited to the embodiments described above, but all changes and modifications thereof, not constituting departures from the spirit and scope of the invention, are intended to be included.

I claim:

1. A landing flap system in an aircraft wing, the aircraft having a longitudinal axis, there being an upper and a lower track and a drive means, a tandem, flap moving carriage, comprising:

an inner carriage having a plurality of rollers for running on the upper track;

an outer carriage having at least two rollers for running on the lower track;

said rollers each having an axis;

hinge means for interconnecting the inner carriage and the outer carriage, for hinging about an axis that extends parallel to said axes of said rollers;

said hinge means connecting the carriages to the landing flap;

second hinged connect means for connecting the outer carriage to the landing flap in a second downstream connection point;

thrust rod and tension means hingedly connecting the outer carriage to the drive means; and further rollers arranged at an acute angle to an axis that extends vertically to said roller axes and to a particular axis that is parallel to said longitudinal axis of the craft, the further rollers stabilizing and thereby balancing the positions of the carriages.

2. System as in claim 1, said second hinged connect means including a steering frame.

3. System as in claim 1, the outer carriage having two rollers.

4. System as in claim 1, said inner carriage having four rollers for the upper track, and four further rollers.

5. A landing flap system in an aircraft wing, the aircraft having a longitudinal axis, there being an upper and a lower track and a drive means, a tandem, flap moving carriage, comprising:
- an inner carriage having rollers for running on the upper track;
- an outer carriage having at least two rollers for running on the lower track;
- first hinge means for connecting the inner carriage to the outer carriage, and to the landing flap, at a point for retracted flap, upstream from a point of air force resultant action on the flap;
- second hinged connect means for connecting the outer carriage to the landing flap in a second downstream connection point;
- thrust rod and tension means hingedly connecting the outer carriage to the drive means; and
- further rollers arranged at an acute angle to an axis that extends vertically to such axes and to an axis that is parallel to the longitudinal axis of the craft, the further rollers stablizing and position-balancing the carriages.

* * * * *